April 1, 1969  T. J. GORDON  3,436,134
WHEEL ASSEMBLY
Filed Nov. 29, 1966

INVENTOR:
THOMAS J. GORDON
BY Parrott, Bell, Seltzer, Park & Heard
ATTORNEYS

United States Patent Office 3,436,134
Patented Apr. 1, 1969

3,436,134
WHEEL ASSEMBLY
Thomas J. Gordon, Decatur, Ga., assignor to Transport Engineering, Inc., Charlotte, N.C., a corporation of North Carolina
Continuation-in-part of application Ser. No. 566,598, July 20, 1966. This application Nov. 29, 1966, Ser. No. 597,736
Int. Cl. F16c 33/00
U.S. Cl. 308—190                                      5 Claims

ABSTRACT OF THE DISCLOSURE

A wheel assembly mounted for rotation on an end portion of an axle comprising inboard and outboard antifrictional radial and axial thrust bearings engaging the axle and surrounded by the hub of the wheel and means carried by the hub of the wheel engaging the outer races of the bearings ot vary the distance between the outer races of the bearings for preloading the bearings.

---

This invention relates to a rotatable wheel assembly and is a continuation-in-part of my copending application Ser. No. 566,598, filed July 20, 1966.

In my copending application, I provide a wheel assembly having means for accurately preloading the bearings at the time of original installation which is so constructed that the preload on the bearings is retained during subsequent removal and replacement of the wheel for maintenance.

Prior to my copending invention, the load-bearing members of wheel assemblies have radial and axial thrust bearings were manually stressed or loaded each time the wheels were removed since wheel removal displaced the bearings on the axle. In replacing the wheels, the bearings were loaded by the local repairman by controlling the primary locking nut retaining the wheel on the axle, which locking nut abuts the inner race of the outboard bearing so that tightening of the nut applies preload pressure to the load-bearing elements.

Because of the high degree of accuracy required to properly load the bearings for optimum efficiency, the average repairman does not possess the knowledge or equipment necessary and, consequently, wheels and bearings are often damaged during subsequent operation of the assembly.

By means of the present invention, I have provided an improvement in the wheel assembly of the type described which permits the bearings to be accurately preloaded at the time of original installation of the wheel which assembly is more economical and less costly to manufacture than that described in my copending application.

More specifically, in the present invention, I provide means for accurately preloading wheel bearings of the conventional type which are displaced during removal of the wheel so that, upon subsequent replacement of the wheel, the same preload is automatically restored to the relocated bearings when the repairman replaces the bearings and wheel on the support axle of the vehicle being serviced.

Some of the objects of the invention having been stated, other objects will appear as the description proceeds when taken in connection with the accompanying drawings, in which.

Figure 1:
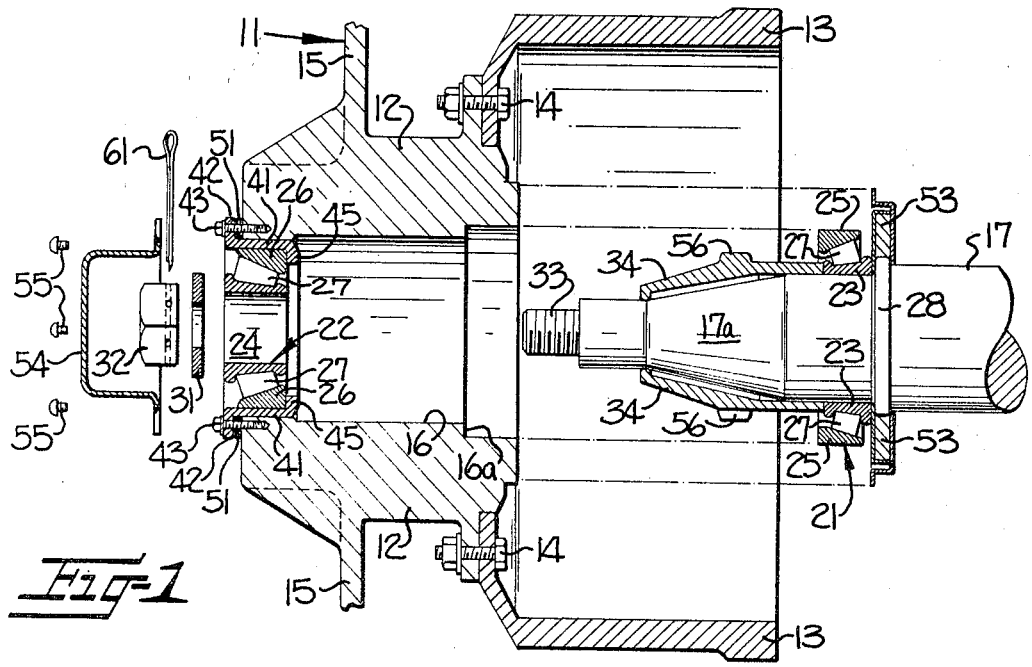
FIGURE 1 is an exploded cross-sectional view, with parts broken away, of a wheel assembly of the present invention showing the relationship of the various components of the assembly with respect to the end portion of a supporting axle.

Referring more specifically to the drawings, FIGURE 1 shows a wheel assembly including a wheel, generally indicated at 11, having a hub 12, and a brake drum 13 affixed to the hub by a plurality of bolts 14. The wheel 11 has a plurality of spokes 15 which extend radially outwardly from the hub 12 and support an annular tire-receiving rim (not shown).

The hub 12 has a cylindrical passageway 16 through which an end portion of a supporting axle 17 extends. Positioned between the axle and hub are inboard and outboard tapered roller bearings 21, 22 which have respective inner races 23, 24 which engage the peripheral surface of the axle 17 and respective outer races 25, 26 spaced from the inner races by a plurality of rotatable, tapered rollers 27. The bearings are so arranged that the smaller ends of the rollers of each bearing are directed generally towards the other bearing and the hub passageway 16 is provided with an internal shoulder 16a which engages the outer race 25 of the inboard bearing and restricts its outward movement along the axle when the hub 12 is secured thereto.

Figure 2:
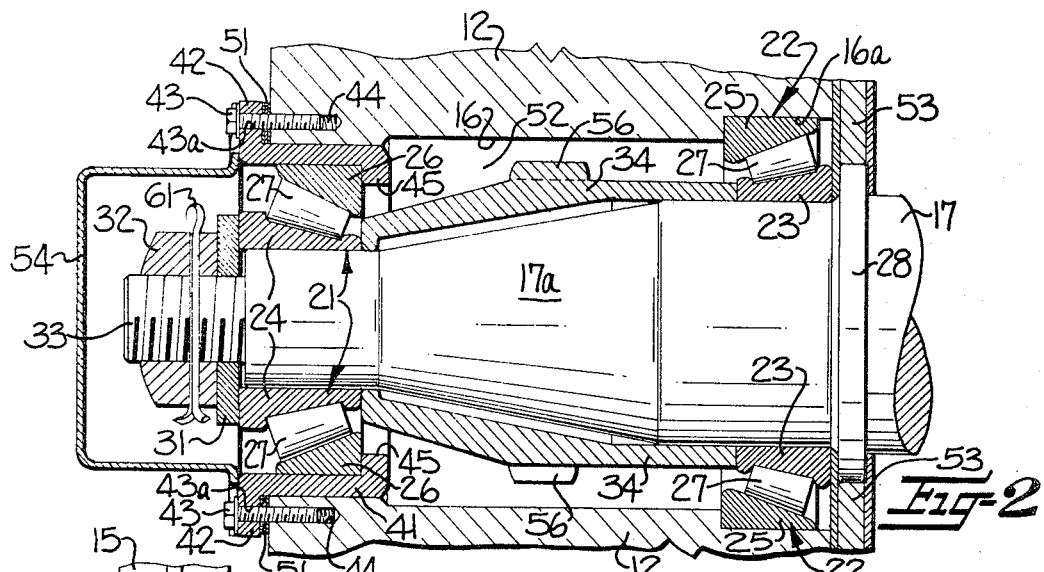
FIGURE 2 is an enlarged view, with parts broken away, of the wheel assembly of FIGURE 1 showing the hub attached to the axle.

The inner races of the respective bearings are fixed in their axial position on the support axle. As seen in FIGURE 2, a raised annular rim or shoulder 28 on the axle 17 abuts the inboard edge of the inner race 23 of the inboard bearing to restrain it against inward movement along the axle, and the inner race 24 of the outboard bearing is restrained against outward movement along the axle by an abutting washer 31 and locking nut 32, which is threadably secured to a stud 33 located on the outboard end of the axle. The inner races of the bearings are retained at a fixed distance from each other by a rigid cylindrical spacer element 34 which surrounds a tapered portion 17a of the axle and abuts the proximal edges of the inner races. As can be seen, the locking nut 32 also retains the wheel on the axle during operation of the assembly. Thus, when the wheel is placed on the end of the axle 17 and the locking nut 32 tightened to secure the wheel thereon, the inner races 23, 24 of the bearings are simultaneously fixed in their axial positions on the surface of the axle.

The tapered roller bearings may be preloaded by varying the axial distance between the outer races. An adjustable cup-shaped bracket 41 is positioned within the outboard end of the cylindrical passageway 16 of the hub and slidably engages the walls of the passageway. The cup-shaped bracket 41 has an outwardly extending flange 42 which overlies an outboard end portion of the hub and the bracket is secured to the hub by a plurality of bolts 43 which extend through spaced openings 43a in the outwardly extending flange and engage internally threaded orifices 44 in the outer end of the hub. The bracket 41 has an inwardly extending flange 45 which engages the inboard side of the outer race 26 of the outboard bearing 22 to control its inward movement with respect to the hub 12.

To vary the position of the bracket 41 in the hub passageway 16, a plurality of annular shims 51 may be inserted between the outer end of the hub and the outwardly extending flange 42 of the bracket. By varying the size or number of shims between the flange and the end of the hub, the bracket and outer race 26 of the outboard bearing can be moved inwardly or outwardly with respect to the axle 16. Since the outer race 25 of the inboard bearing is restrained against outward movement along the axle by the shoulder 16a, axial movement of the outer race 26 of the outboard bearing directly varies the distance between the outer races determines the axial force applied to the bearings. By varying this axial force, the bearings may be accurately preloaded to a desired pressure.

Figures 3, 4:
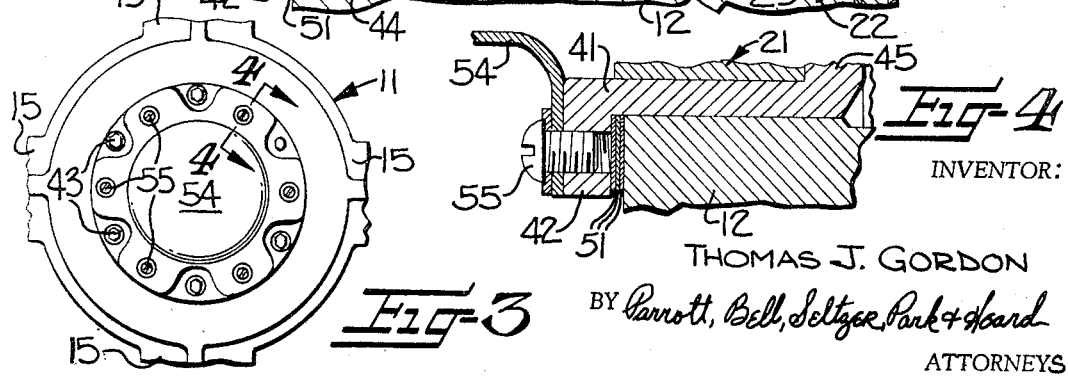
FIGURE 3 is an end view, with parts broken away, of the hub cap cover of the wheel assembly.
FIGURE 4 is an enlarged fragmentary view taken along line 4—4 of FIGURE 3 showing in more detail the fastening means for removably securing the hub cap cover to the hub of the wheel.

The hub is suitably spaced from the axle and spacer element to define an annular chamber 52 for the reception of lubrication for the bearings. A gasket 53 surrounds the support axle 17 adjacent the shoulder 28 and engages the inboard end of the hub 12 to effectively seal the bearings against loss of lubricant along the axle. A hub cap cover 54, attached to the annular bracket 41 by suitable fastening means, such as a plurality of set screws 55 (FIGURES 3 and 4), overlies the end of the support axle to seal the bearings from loss of lubricant outwardly of the hub and axle.

Located on the spacer element are a plurality of upstanding vanes 56 which, during rotation of the wheel about the axle, serve to distribute lubricant between the bearings through the annular chamber 52 therebetween. To aid in flow of lubricant outwardly along the shaft, the spacer element is tapered toward the outboard end thereof.

To initially preload the bearings of the wheel assembly prior to mounting the wheel on the axle, the fastening bolts 43 are removed from the hub, the cup-shaped bracket 41 slidably disengaged from the central passage 16, and a selected number of annular shims 51, depending on the particular preload to be placed on the bearings, placed against the outboard end of the hub. The bracket is then re-inserted in the passageway and the fastening bolts replaced and tightened to move the bracket inwardly until the inner face of the flange 42 snugly engages the outer shim of the pack.

With the inner and outer bearings in place on the axle and bracket, respectively, and the spacer element 34 between the inner races thereof, the wheel, aligned with the end of support axle, is moved theretoward until the shoulder 16a of the hub engages the outer race 25 of the inboard bearing 21. The washer 31 and locking nut 32 are then inserted onto the lug 33 and the nut rotated until the inner races are snugly secured in fixed position on the axle. A locking pin 61 is inserted into the nut to prevent its accidental displacement due to rotation of the wheel.

By providing means to preload the bearings by adjusting the position of the outer races while maintaining the inner races fixed, the inaccuracies of preloading during removal and replacement of the wheel are eliminated, since the position of the locking nut which retains the wheel is no longer critical.

Although the wheel assembly of the invention as disclosed is a freely rotatable wheel secured to a fixed axle, the wheel may be driven by appropriate drive means if desired; and, although the bearings are shown and described as tapered roller bearings, other anti-friction radial and axial thrust bearings may be substituted therefor without effecting the operability of, or departing from the scope of, the present invention.

In the drawings and specification there has been set forth a preferred embodiment of the invention and, although specific terms are employed, they are used in a generic and descriptive sense only and not for purposes of limitation, the scope of the invention being defined in the claims.

I claim:

1. A wheel assembly mounted for rotation on an end portion of an axle, said wheel assembly comprising an inboard and an outboard antifriction radial and axial thrust bearing, each bearing having an inner and an outer race and rotatable means positioned between and engaging the inner faces of said races; means for maintaining each inner race of the bearings at a fixed position on said axle; a wheel having a hub surrounding said bearing; means carried by said hub, including means formed integrally therewith for engaging the outboard side of the outer race of the inboard bearing, and bracket means for engaging the inboard side of the outer race of the outboard bearing, to vary the distance between the outer races of the bearings along said axle to preload the bearings; and means for maintaining the inner races of the bearings at fixed positions including means for releasably securing said wheel hub for rotation on said axle.

2. A wheel assembly mounted for rotation on an end portion of an axle, said wheel assembly comprising an inboard and an outboard antifriction radial and axial thrust bearing, each bearing having an inner and an outer race and rotatable means positioned between and engaging the inner faces of said races; means for maintaining each inner race of the bearings at a fixed position on said axle; a wheel having a hub surrounding said bearings; means carried by said hub, including means formed integrally therewith for engaging the outer race of the inboard bearing, to vary the distance between the outer races of the bearings along said axle to preload the bearings; said means for maintaining the inner races of the bearings at fixed positions including means for releasably securing said wheel hub for rotation on said axle; and wherein said means to vary the distance between the outer races of the bearings includes an annular cup-shaped bracket attached to an outboard portion of the hub and surrounding the axle, said bracket having a radially inwardly extending and radially outwardly extending flange, the inwardly extending flange engaging the inboard side of the outer race of the outboard bearing and the outwardly extending flange overlying the outboard end portion of the hub of the wheel, shim means removably positioned between the outwardly extending flange and the outboard end portion of the hub to position the bracket axially with respect to the hub, and means securing the bracket to the hub.

3. A wheel assembly was defined in claim 2, wherein the outwardly extending flange of the said bracket has a plurality of spaced openings therethrough, and wherein the underlying outboard portion of said hub has a plurality of internally threaded openings aligned with the openings within said outwardly extending flange, and wherein said means securing the bracket to the hub includes a plurality of bolts extending through the openings in said outwardly extending flange and engaging the openings in the outboard portion of the hub.

4. A wheel assembly as defined in claim 1, wherein said means formed integrally with the hub for engaging the outer race of the inboard bearing includes a shoulder abutting the outboard end of the outer race of the inboard bearing to limit its outboard movement.

5. A wheel assembly as defined in claim 1, wherein said means for maintaining each inner race of the bearings at a fixed position on said axle includes a rigid spacer element surrounding said axle and abutting the proximal edges of the inner races of the respective bearings, a raised shoulder on said axle abutting the distal edge of the inner race of the inboard bearings, and a locking nut and washer abutting the distal edge of the inner race of the outboard bearing; said hub and said spacer element defining therebetween an annular lubricant-distribution chamber communicating with said inboard and outboard bearings, and means on said rigid spacer element for facilitating distribution of lubricant to the bearings.

References Cited

UNITED STATES PATENTS

| 1,096,805 | 5/1914 | Gohlke | 308—191 |
| 1,671,682 | 5/1928 | Norris | 308—207 |
| 1,742,825 | 1/1930 | Sanders et al. | 208—207 |
| 1,881,780 | 10/1932 | Malcolm | 308—117 |
| 3,156,506 | 11/1964 | Scheifele | 308—211 |

MARTIN P. SCHWADRON, *Primary Examiner.*

FRANK SUSKO, *Assistant Examiner.*

PO-1050
(5/69)

UNITED STATES PATENT OFFICE
CERTIFICATE OF CORRECTION

Patent No. 3,436,134      Dated April 1, 1969

Inventor(s) Thomas J. Gordon

It is certified that error appears in the above-identified patent and that said Letters Patent are hereby corrected as shown below:

Column 1, Line 19, "ot" should be --of; Column 1, Line 33, "have" should be --having--. Column 2, Line 61, "fiange" should be --flange--. Column 3, Lines 17 and 18, after "races" insert a period --.-- and before "determines" insert the following; --Due to the configuration of the tapered rollers, the distance between the outer races--; same column, Line 23, "lubrication" should be --lubricant--; same column, line 42, "passage" should be --passageway--. Column 4, Line 13, "bearing" should be --bearings--; same column, Line 51, "was" should be --as--.

SIGNED AND
SEALED
MAR 17 1970

(SEAL)
Attest:

Edward M. Fletcher, Jr.
Attesting Officer

WILLIAM E. SCHUYLER, JR.
Commissioner of Patents